United States Patent
Glover

(10) Patent No.: US 6,789,385 B2
(45) Date of Patent: Sep. 14, 2004

(54) SYSTEM FOR SUPPLYING SECONDARY AIR IN THE EXHAUST SYSTEM OF AN INTERNAL COMBUSTION ENGINE

(75) Inventor: Stephen Brian Glover, Killarney (IE)

(73) Assignee: Ricardo UK Limited (GB)

( * ) Notice: Subject to any disclaimer, the term of this patent is extended or adjusted under 35 U.S.C. 154(b) by 0 days.

(21) Appl. No.: 10/467,848
(22) PCT Filed: Feb. 8, 2002
(86) PCT No.: PCT/GB02/00536
§ 371 (c)(1), (2), (4) Date: Feb. 13, 2004
(87) PCT Pub. No.: WO02/064955
PCT Pub. Date: Aug. 22, 2002

(65) Prior Publication Data
US 2004/0128986 A1 Jul. 8, 2004

(30) Foreign Application Priority Data
Feb. 13, 2001 (GB) .............................................. 0103522

(51) Int. Cl.$^7$ ................................................. F01N 3/00
(52) U.S. Cl. .............................. 60/293; 60/289; 60/308; 181/293
(58) Field of Search ......................... 60/293, 289, 304, 60/307, 308; 181/293

(56) References Cited
U.S. PATENT DOCUMENTS

| | | | | |
|---|---|---|---|---|
| 3,066,477 A | * | 12/1962 | Houdry | ........................ 60/293 |
| 4,177,640 A | | 12/1979 | Kuroda et al. | ................. 60/274 |
| 4,590,762 A | * | 5/1986 | Mifuji et al. | .................. 60/293 |
| 5,392,601 A | * | 2/1995 | LeVine | ......................... 60/293 |
| 5,431,013 A | * | 7/1995 | Yamaki et al. | ................. 60/289 |
| 5,887,424 A | | 3/1999 | Kuroshita | ..................... 60/293 |
| 5,902,971 A | | 5/1999 | Sato et al. | .................... 181/262 |

FOREIGN PATENT DOCUMENTS

EP        0 694 680 A2    1/1996

\* cited by examiner

Primary Examiner—Thomas E. Denion
(74) Attorney, Agent, or Firm—Osha & May L.L.P.

(57) ABSTRACT

A reciprocating piston engine (2) includes an exhaust system comprising an exhaust pipe (8) which communicates with a silencer (10), whose upstream portion (11) is divergent in the direction of gas flow through it, an oxidising catalyst (12) and an air supply pipe (14) communicating with the exhaust pipe at a position upstream of the catalyst and silencer. The air supply pipe (14) includes a Reed valve (16) which is adapted to open under a pressure differential to permit air to flow into the exhaust pipe. In order to maximise the air flow into the exhaust pipe the effect of pressure pulses within the exhaust pipe is utilised and for this purpose $3L_2-(2L_1+L_2)$ is equal to $\pm 0.25$ to $0.5$ m, wherein is the distance from the junction of the exhaust pipe (8) measured from a first intersection point at which the axes of the exhaust pipe (8) and the air supply pipe (14) intersect, to a point midway along the length in the flow direction of the said upstream portion (11) of the silencer (10) and $L_2$ is the length of the air supply pipe (14) from the Reed valve (16) to the said first intersection point.

4 Claims, 1 Drawing Sheet

Figure 1:
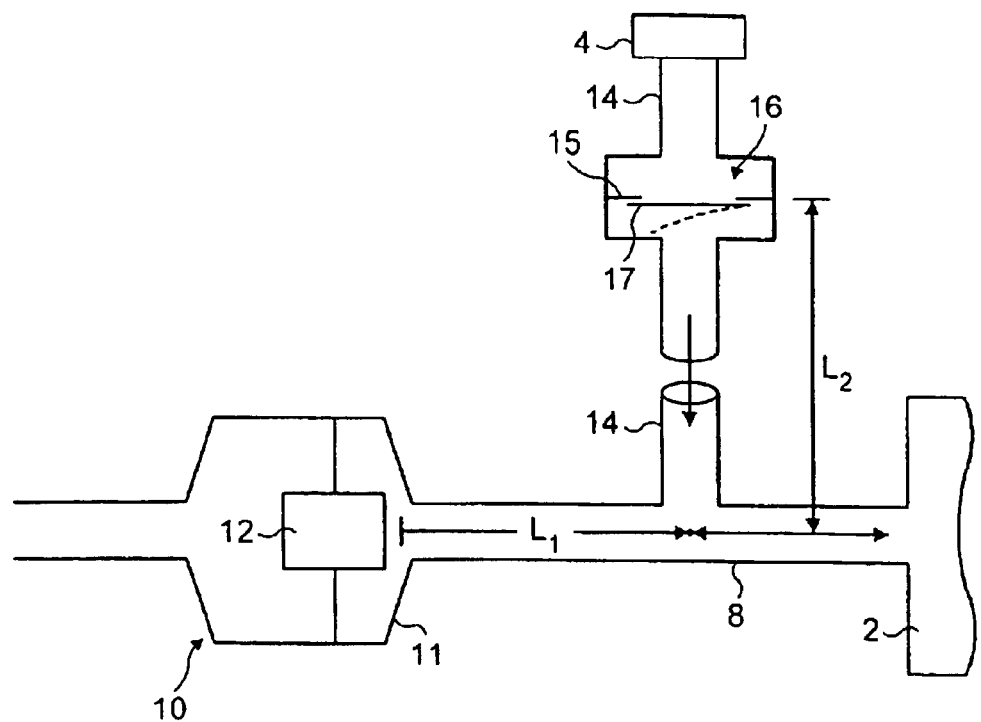

SYSTEM FOR SUPPLYING SECONDARY AIR IN THE EXHAUST SYSTEM OF AN INTERNAL COMBUSTION ENGINE

The present invention relates to reciprocating engines of four stroke and more particularly two stroke type and is concerned with that type of such engine which includes an exhaust system, the exhaust system comprising an exhaust pipe which communicates with a silencer, whose upstream portion is divergent in the direction of gas flow through it, one or more oxidising catalysts and an air supply pipe communicating with the exhaust pipe at a position upstream of the catalyst and silencer.

The exhaust gases of two stroke engines are usually rich in unburnt hydrocarbons, that is to say oil and gasoline, and carbon monoxide, as a result of incomplete combustion and of the fact that purging of the combustion space is commonly performed with an air/gasoline mixture. In order to prevent excessive emissions of such unburnt hydrocarbons to the atmosphere it is common to provide an oxidising catalyst in the exhaust system whose purpose is to oxidise the hydrocarbons and carbon monoxide to carbon dioxide and water.

However, there is generally insufficient oxygen in the exhaust gas flow to completely oxidise all the hydrocarbons and carbon monoxide. Furthermore, the substantial amount of such substances that are oxidised result in the catalyst reaching a very high temperature and thus in its being progressively degraded and its service life shortened.

It is therefore known to provide an air supply pipe communicating with the exhaust pipe at a point upstream of the catalyst in order both to provide additional oxygen for oxidising purposes and to cool the catalyst. U.S. Pat. No. 5,902,971 discloses such an engine in which the air supply pipe is connected to a diaphragm pump, which is operated by the pressure pulses in the crankcase and supplies the necessary air to the exhaust system. However, the diaphragm pump adds not inconsiderably to the weight, cost and complexity of the engine. U.S. Pat. No. 5,887,424 discloses such an engine in which air is induced into the silencer by the ejector or entrainment effect. This adds a considerable degree of complexity to the silencer and means that the exhaust system has to be designed to maximise the entrainment of air rather than engine efficiency.

Accordingly it is an object of the present invention to provide a two stroke engine with means for supplying air into the exhaust system which is cheap, light and effective, and in particular does not use a pump or ejector, and permits the exhaust system to be designed with a view to maximising engine efficiency.

In accordance with the present invention, in an engine of the type referred to above the air supply pipe includes a Reed valve adapted to open under a pressure differential to permit air to flow into the exhaust pipe and the difference between $L_2$ and $(2L_1+L_2)$ is between 0.25 and 0.5 m, preferably 0.3 and 0.4 m and particularly preferably 0.35 to 0.4 m, wherein $L_1$ is the distance from the junction of the exhaust pipe measured from a first intersection point at which the axes of the exhaust pipe and the air supply pipe intersect, to a point midway along the length in the flow direction of the said upstream divergent portion of the silencer and $L_2$ is the length of the air supply pipe from the Reed valve to the said first intersection point.

The invention is based on the recognition that there are wildly varying pressures within the exhaust system and that the pressure wave caused when the interior of the or each cylinder of the engine initially communicates with the exhaust system at the beginning of expulsion of the exhaust gas can be reflected and cause the pressure locally within the exhaust system to fall briefly to sub-atmospheric values of e.g. a maximum of −1000 mbar gauge or more typically down to −400 mbar gauge, e.g. −100 to −300 mbar gauge. Such sub-atmospheric pressures can be sufficient to open a Reed valve and cause a small amount of air to flow through it. Accordingly the air supply pipe is provided with a Reed valve which is caused to open periodically by reduced pressure pulses which act on it.

However, it has been found that the provision of a Reed valve alone does not necessarily result in sufficient air being induced into the exhaust system and that the amount of air that is induced is dependent on the relationship between certain dimensions of the exhaust system. This will be explained in more detail below.

In use, as exhaust gas starts to flow into the exhaust pipe in each cycle of the or each cylinder of the engine, a positive pressure wave passes down the exhaust pipe at substantially the speed of sound. When this wave reaches the junction with the air supply pipe it propagates both along the exhaust pipe and along the air supply pipe waves.

The first positive wave that continues towards the silencer is progressively reflected back as it reaches the conically diverging portion at the upstream end of the silencer, but in the form of a negative pressure wave, due to the fact that the cross-sectional area of the silencer is inherently larger than that of the exhaust pipe. The plane from which the positive wave is reflected is therefore effectively half way along the conically diverging portion in the flow direction. When this negative pressure wave meets the junction with the air supply pipe it moves up the air supply pipe. When this negative pressure wave, which will be referred to as the first negative pressure wave, reaches the Reed valve it causes it to open for a short period of time, thereby admitting air into the exhaust pipe.

The second positive wave that continues towards the Reed valve is reflected back at the Reed valve in the form of a positive wave towards the exhaust pipe. When it reaches the exhaust pipe it expands and is reflected back towards the Reed valve, but in the form of a negative wave. When this further negative wave, which will be referred to as the second negative pressure wave, reaches the Reed valve it causes it to open and admit air. If the phasing of the two negative pressure waves is such that the two waves arrive at the Reed valve substantially simultaneously or substantially overlapping with one another at the Reed valve, it is found that not only is a relatively small volume of air induced but also the force applied to the Reed valve may be sufficient to break it. If the two waves do not overlap at all at the Reed valve, the valve is caused to open twice for two very short periods of time but much of the energy of the waves is consumed by opening the valve and relatively little air is caused to flow into the air supply pipe. However, if the phasing of the two waves is such that they overlap very slightly at the Reed valve, the valve will be held open for a longer period of time, i.e. the sum of the duration of the two negative waves, and a sufficient volume of air is induced to achieve the desired beneficial effect. The relative phasing of the two negative pressure waves is determined by the distance which they have travelled, namely $3L_2$ and $2L_1+L_2$, respectively. If the time taken to travel the difference between those two distances at the speed of sound is slightly less than the duration of one of the waves, then the waves will overlap slightly at the Reed valve. Since the speed of sound will vary with temperature and the different pipes are at different temperatures, the distances referred to above should be corrected for temperature, namely typically 30° C. in the air supply pipe and 500° C. in the exhaust pipe. It is immaterial whether the first negative pressure wave arrives at the Reed valve before or after the second negative pressure wave and this is why one length subtracted from the other may result in a positive or negative value.

If the negative pressure wave reflected back from the divergent portion of the silencer reaches the exhaust valve or port as it opens, this will promote the efficient discharge of exhaust gas from the cylinder thereby increasing delivery ratio and will thus increase the power output from the engine. Whilst this is desirable for some applications, the invention is particularly applicable to small two stroke engines of the type which are fitted to small motor scooters or mopeds. Some countries have legislation prohibiting such engines from producing more than a prescribed power output. It is therefore common for such engines to be provided with a blind resonator pipe, whose diameter is less than that of the exhaust pipe and which communicates with the exhaust pipe. This resonator pipe communicates with the exhaust pipe at a position whose distance from the mid-point of the diverging portion of the silencer is substantially equal to its length. In use, the positive pressure wave caused by the opening of the exhaust valve is again reflected back from the silencer in the form of a negative wave which travels back towards the exhaust valve. However, the positive wave also travels up the resonator pipe and is reflected back from its closed end, still in the form of a positive pressure valve. This wave re-enters the exhaust pipe and also travels towards the exhaust port. The resonator pipe is positioned and dimensioned so that the aforementioned positive and negative pressure waves arrive at the exhaust port at the same time, whereby the positive pressure wave counteracts the effect of the negative pressure wave and there is no enhancement of the power output of the engine.

It will, however, be appreciated that the positive pressure wave that is reflected back down the resonator pipe and passes along the exhaust pipe towards the exhaust valve is also reflected back into the resonator pipe for a second time, though now in the form of a negative pressure wave due to the fact that the resonator pipe is smaller than the exhaust pipe. This negative pressure wave is reflected back from the closed end of the resonator pipe and then passes into the exhaust pipe. It then moves towards the exhaust port and also towards the Reed valve. The negative pressure wave reflected back from the silencer will arrive at the Reed valve but will not have the beneficial effect of opening the Reed valve because its effect is neutralised by the positive pressure wave from the resonator pipe discussed above, which arrives at the Reed valve at substantially the same time. If, however, the negative pressure wave from the resonator pipe discussed above arrives at the Reed valve at a time at which it overlaps slightly by the second negative pressure wave described above in connection with the first embodiment with no resonator pipe then the same beneficial effect may be obtained as in that previous embodiment. In order to obtain this effect the value of $3L_2-(L_2+2L_3+4L_4)$ should be equal to +0.25 m to +0.45 m or −0.45 m to −0.6 m, or more preferably +0.15 m to +0.35 m or −0.35 m to −0.5 m, wherein $L_2$ is the length of the air supply pipe from the Reed valve to a first intersection point at which the axes of the exhaust pipe and the air supply pipe intersect, $L_3$ is the distance between the first intersection point and a second intersection point, at which the axes of the resonator pipe and the exhaust pipe intersect and $L_4$ is the length of the resonator pipe from its closed end to the second intersection point. The distances must of course again be corrected for the temperature at which they actually operate. There are again two possible ranges into which the distance covered by one pressure wave subtracted from the distance covered by the other pressure wave may fall because it again does not matter in which order the two pressure waves arrive at the Reed valve.

Figure 2:
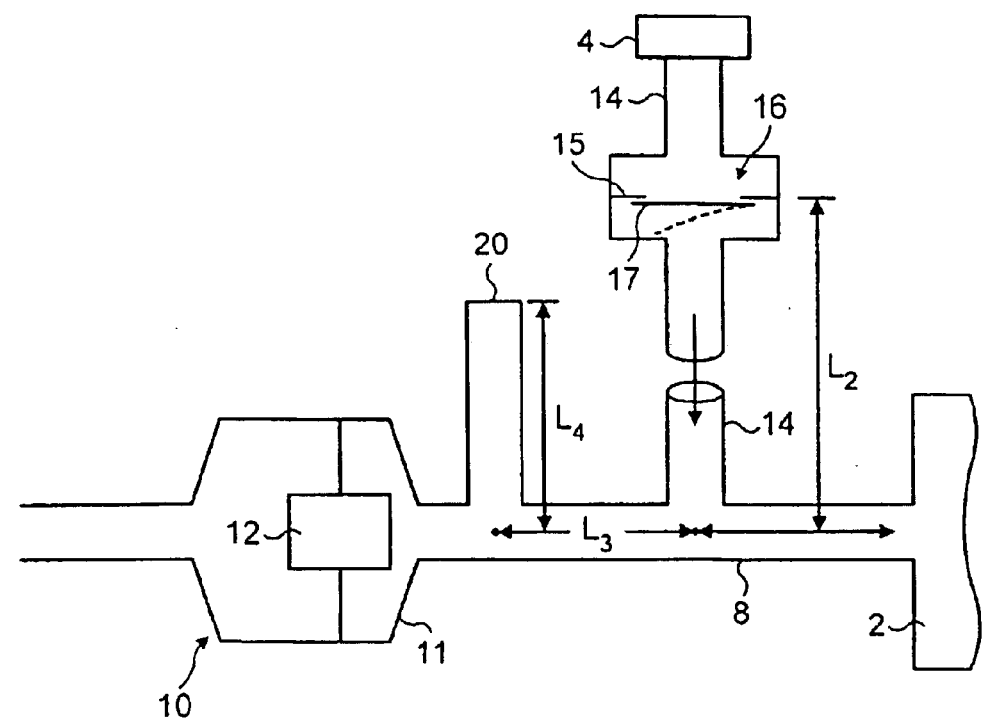

Further features and details of the invention will be apparent from the following description of two specific embodiments which is given by way of example only with reference to the accompanying drawings, in which:

FIG. 1 is a highly schematic view of the relevant portions of a two stroke engine in accordance with the invention; and FIG. 2 is a similar view of an alternative construction of a two stroke engine in accordance with the invention.

The engine includes a crankcase, a cylinder barrel or block and a cylinder head which form no part of the present invention and are generally designated 2 in FIG. 1. The cylinder block defines one or more cylinders in which respective pistons are mounted to reciprocate. The pistons are connected by respective connecting rods to a crankshaft.

Connected to the or each exhaust port of the engine is an exhaust system including an exhaust pipe 8 whose downstream end is connected to a silencer 10. The silencer 10 has an upstream conically divergent portion 11 followed in this case by a cylindrical portion and then a conically convergent portion. The silencer communicates with the atmosphere into which the exhaust gases from the engine are discharged. The exhaust system also includes an oxidising catalyst 12, which in this case is situated within the silencer 10. The purpose of the oxidising catalyst is to catalyse the conversion of unburnt hydrocarbons and CO into water and $CO_2$. Communicating with the exhaust pipe 8 at a position between the engine block/cylinder head and the silencer 10 is an air supply pipe 14, the diameter of which is less than the diameter of the exhaust pipe. The air supply pipe 14 includes a passive Reed valve 16 which is normally closed but which will open when the pressure applied to it on the exhaust pipe side is less than that on the other side. The Reed valve 16 comprises a valve seat 15 and a valve flap 17. The Reed valve communicates with the atmosphere via an air supply pipe 14 which includes an air filter 4.

The generation, reflection and timing of the pressure waves within the exhaust system has already been explained above. However, briefly, the distance $L_1$ is the distance between a point mid-way along the length in the flow direction of the divergent portion 11 of the silencer 10 and the junction of the exhaust pipe 8 with the air supply pipe 14, measured from the point at which their axes intersect. When the exhaust port opens a positive pressure wave moves down the exhaust pipe 8. When it reaches the air supply pipe 14 it passes along the air supply pipe as well as continuing along the exhaust pipe. The first positive wave moves up the air supply pipe, is reflected back at the Reed valve, moves back to the exhaust pipe and then reflected back into the air supply pipe, but in the form of a negative wave which ultimately arrives at the Reed valve. The second positive wave moves along the exhaust pipe and is reflected back at the silencer, effectively at a plane which is half way along the length of the diverging portion 11, in the form of negative wave. The negative wave moves back along the exhaust pipe and splits into two at the air supply pipe. One of these negative waves then arrives at the Reed valve. The distances travelled by the two negative waves which arrive at the Reed valve are related by the formula given above so that they arrive at the Reed valve at times such that they overlap slightly. The Reed valve is thus held open for one single and relatively long period of time for each time that the exhaust valve opens and this period of time is sufficiently long to admit a sufficient volume of air to cool the catalyst adequately and to result in the combustion of the catalyst of substantially all the unburnt hydrocarbons and carbon monoxide in the exhaust gas.

In the alternative construction illustrated in FIG. 2 the exhaust pipe additionally communicates with a resonator tube 20 which is provided for the reason explained above. The length of the resonator tube is substantially equal to its distance from the mid-point of the diverging portion of the silencer and its diameter is less than that of the exhaust pipe.

When the exhaust valve opens a positive wave moves along the exhaust pipe and splits into two at the junction with the air supply pipe. The first positive wave moves three times along the air supply pipe and ultimately arrives at the Reed valve in the form of a negative wave, precisely as in the first embodiment. The second positive wave continues along the exhaust pipe until it reaches the resonator pipe and then splits into two positive waves, which will be referred to as the first and second positive waves. The first positive wave moves along the exhaust pipe and is then reflected back from the silencer in the form of a negative wave. The second positive wave moves along the resonator tube and is reflected back at its closed end. When it reaches the exhaust pipe again it splits and part of it travels towards the exhaust valve. However, it travels together with the negative wave reflected from the silencer and therefore has no effect on the discharge of exhaust from the cylinder. The second positive wave is also reflected back into the resonator pipe, but in the form of a negative wave. This negative wave is reflected back from the closed end of the resonator tube and then passes into the exhaust pipe and ultimately arrives at the Reed valve. The lengths of the various pipes are so related that the time of the arrival of the two negative waves at the reed valve is again such that they overlap slightly, whereby the reed valve is open for a single relatively long period of time for each time that the exhaust valve opens.

I claim:

1. A reciprocating engine (2) including an exhaust system, the exhaust system comprising an exhaust pipe (8) which communicates with a silencer (10), whose upstream portion (11) is divergent in the direction of gas flow through it, an oxidising catalyst (12) and an air supply pipe (14) communicating with the exhaust pipe at a position upstream of the catalyst and silencer, characterised in that the air supply pipe (14) includes a Reed valve (16), that the Reed valve is adapted to open under a pressure differential to permit air to flow into the exhaust pipe (8) and that $3L_2-(2L_1+L_2)$ is equal to $\pm 0.25$ to $0.5$ m, wherein $L_1$ is the distance from the junction of the exhaust pipe (8) measured from a first intersection point at which the axes of the exhaust pipe (8) and the air supply pipe (14) intersect, to a point midway along the length in the flow direction of the said upstream portion (11) of the silencer (10) and $L_2$ is the length of the air supply pipe (14) from the Reed valve (16) to the said first intersection point.

2. An engine as claimed in claim 1 in which $3L_2-(2L_1+L_2)$ is equal to $\pm 0.35$ m to $0.4$ m.

3. A reciprocating engine including an exhaust system (2), the exhaust system comprising an exhaust pipe (8) which communicates with a silencer (10), whose upstream portion (11) is divergent in the direction of gas flow through it, an oxidising catalyst (12), an air supply pipe (14) communicating with the exhaust pipe at a position upstream of the catalyst and silencer, and a resonator pipe (20), one end of which communicates with the exhaust pipe (8) at a point between the silencer (10) and the air supply pipe (14) and the other end of which is closed, characterised in that the air supply pipe (14) includes a Reed valve (16), that the Reed valve is adapted to open under a pressure differential to permit air to flow into the exhaust pipe (8) and that $3L_2-(L_2+2L_3+4L_4)$ is equal to $+0.25$ m to $+0.45$ m or $-0.45$ m to $-0.6$ m, wherein $L_2$ is the length of the air supply pipe (14) from the Reed valve (6) to a first intersection point at which the axes of the exhaust pipe (8) and the air supply pipe (14) intersect, $L_3$ is the distance between the first intersection point and a second intersection point, at which the axes of the resonator pipe (20) and the exhaust pipe (8) intersect and $L_4$ is the length of the resonator pipe (20) from its closed end to the second intersection point.

4. An engine as claimed in claim 3 in which $3L_2-(L_2+2L_3+4L_4)$ is equal to $+0.15$ m to $+0.35$ m or $-0.35$ m to $-0.5$ m.

* * * * *